United States Patent
Fang et al.

(10) Patent No.: US 8,325,731 B2
(45) Date of Patent: Dec. 4, 2012

(54) METHOD FOR ESTABLISHING A CALL RAPIDLY IN CDMA CLUSTER COMMUNICATION SYSTEM

(75) Inventors: Huiying Fang, Shenzhen (CN); Xuemin Liu, Shenzhen (CN); Jiaan Yang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 874 days.

(21) Appl. No.: 11/916,357

(22) PCT Filed: Jun. 2, 2005

(86) PCT No.: PCT/CN2005/000775
§ 371 (c)(1),
(2), (4) Date: Jan. 15, 2008

(87) PCT Pub. No.: WO2006/128324
PCT Pub. Date: Dec. 7, 2006

(65) Prior Publication Data
US 2008/0212519 A1 Sep. 4, 2008

(51) Int. Cl.
*H04L 12/56* (2006.01)
(52) U.S. Cl. .................................. 370/394; 370/396
(58) Field of Classification Search .......... 370/259–260, 370/389–394, 396–398
See application file for complete search history.

(56) References Cited

U.S. PATENT DOCUMENTS

| | | | |
|---|---|---|---|
| 6,873,854 B2 * | 3/2005 | Crockett et al. | 455/518 |
| 6,895,011 B1 * | 5/2005 | Lassers | 370/394 |
| 2006/0148467 A1 * | 7/2006 | Kreitzer et al. | 455/426.1 |
| 2007/0133435 A1 * | 6/2007 | Eneroth et al. | 370/260 |

* cited by examiner

*Primary Examiner* — Phuc Tran
(74) *Attorney, Agent, or Firm* — IPSG, P.C. Intellectual Property Law

(57) ABSTRACT

A method for establishing a call rapidly in a cluster communication system based on code division multiple access, comprising the following steps: a dispatching station server transmitting a normal group call request to a base station subsystem after receiving a normal group call request sent by a calling terminal; the each base station in a dispatching area allocating resource and establishing a forward-reverse traffic channel required by a normal group call service in the base station side after receiving the normal group call request; each sector of the base station in the dispatching area sending a broadcast channel assignment message in a form of broadcast message to the terminals in an idle state in the sector in a forward control channel; the terminals in the sector comparing a broadcast address with a group identification stored, if matching, the terminal establishing each service channel in the side of the terminal in the called state according to the broadcast channel assignment message received; if the broadcast address not matching the group identification stored, the terminal discarding the broadcast channel assignment message.

6 Claims, 1 Drawing Sheet

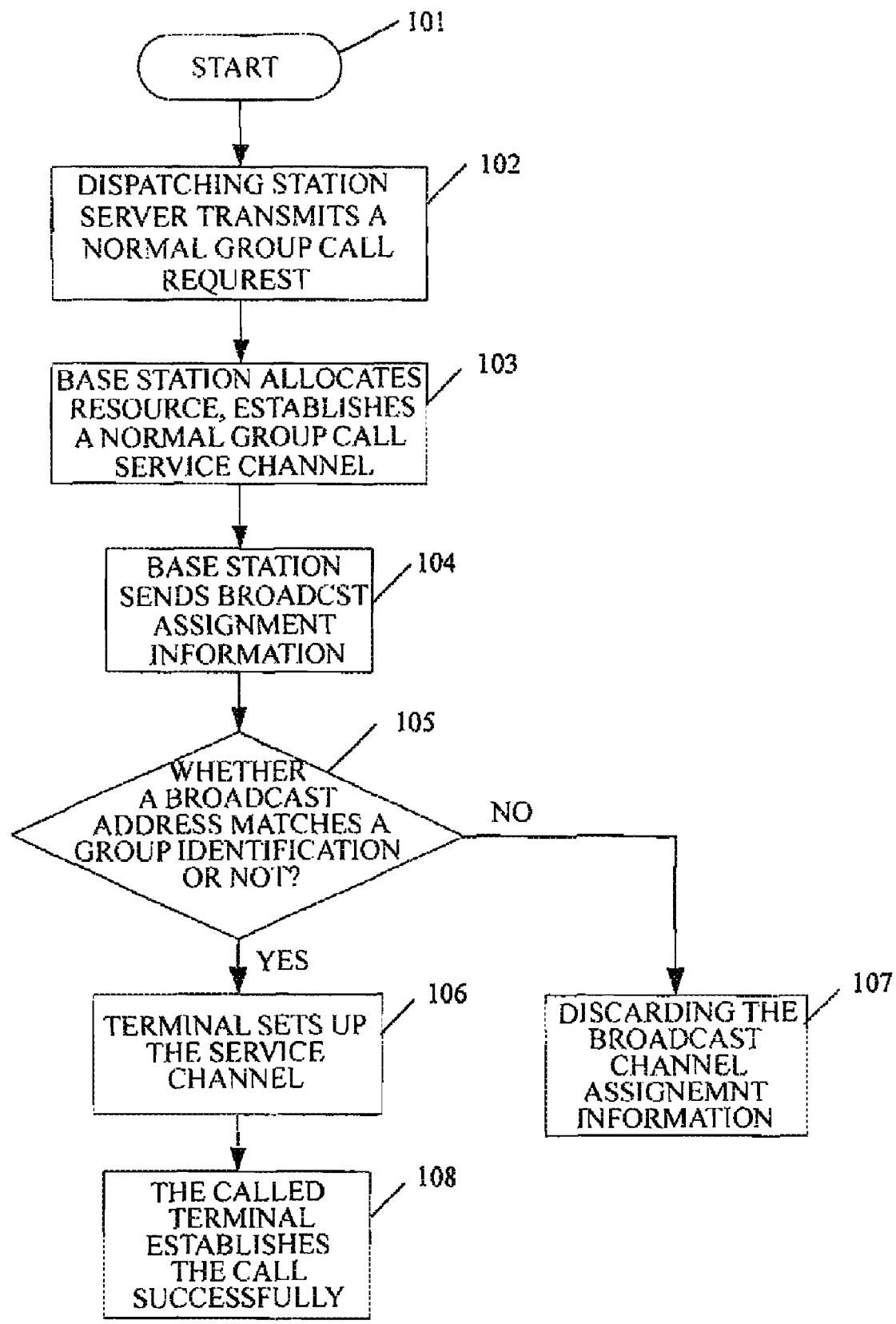

METHOD FOR ESTABLISHING A CALL RAPIDLY IN CDMA CLUSTER COMMUNICATION SYSTEM

This application claims priority based on International Application filed under the Patent Cooperation Treaty, PCT/CN2005/000775 filed on Jun. 2, 2005.

FIELD OF THE INVENTION

The present invention relates to cluster communication in the mobile communication field, and more particularly, a method for establishing a call rapidly by a called terminal in a group call service in a cluster communication system based on code division multiple access (CDMA).

DESCRIPTION OF THE RELATED ART

A CDMA based cluster communication system is a communication system combing the CDMA technology with the exclusive dispatching communication system and adopting a half duplex communication way, which can achieve a quick connection and support a group call (i.e. a one-to-many call type). Such cluster communication system can be broadly applied in the branches such as institutions, enterprises, public security, police and army requiring a higher performance of commanding and dispatching.

The group call service in the CDMA based cluster communication system can be divided into two types: normal group call service and enhanced group call service. The normal group call service is also called conventional group call service or broadcast group call service, which provides support to group call in a cluster with large capacity in a small area (a cluster can include hundreds and thousands of user terminals, which are all located in a sector of a small area) by means of sharing a forward-reverse traffic channel in a sector. As forward-reverse traffic channels in the sector are all shared, in the normal group call service, the interactivity between a dispatching station server (PDS) and a non-talking terminal in a group is relatively weak. The enhanced group call service is also called strong interactivity group call service, for which in addition to setting up a forward traffic channel shared within a group in each sector of the dispatching area (i.e. service area of a cluster call), a forward-reverse traffic channel exclusive for each user terminal of the group in the sector also needs to be established. In this way, the capacity of interactivity between the dispatching station server and each terminal is greatly enhanced through the forward-reverse traffic channel exclusively shared by each user terminal of the group. However, as it will occupy lots of base station resources to set up a traffic channel exclusively shared by each user terminals of a group, the enhanced group call service is only applicable to groups with less group members requiring a higher interactivity.

In the prior art, for the group call service in the CDMA based cluster communication system, the process of setting up a call by the called terminal mainly includes: a dispatching station server PDS sending a request for establishing a group call to a base station subsystem BSS; each base station in a dispatching area respectively initiating a call to a called terminal of groups in each sector; the base station setting up channel resources of a group call service after receiving a call response returned by the called terminal; and respectively sending a channel assignment message to each called terminal. A call between the base station and called terminals can be set up only through processes such as capturing, signaling handshaking and service negotiation etc. Such process of setting up a call by a called terminal in the group call service is a sequential process of establishing a call. For the enhanced group call service, as the number of user terminals of a group in a sector is less, the time of establishing a call by a called terminal in a group can basically satisfy the requirement of a quick response of a cluster communication, while for the normal group call service, the number of user terminals of a group in a sector can reach hundreds and thousands, if each called terminal establishes a call by adopting the above process of establishing a call, the time of establishing a group call will be very long, which cannot satisfy the requirement of a quick response of a cluster communication.

At present, there are also methods for improving a called terminal establishing a call in a group call service in the CDMA based cluster communication system, wherein the basic process of establishing a call is not changed. Some methods optimize the signaling handshaking way in the process of establishing a call, some methods improve the capturing process of a base station or terminals, and some methods optimize the processes of initiating a call and the call responding. The above methods of establishing a call by improving called terminals have obvious effect on accelerating the establishment of a call by a called terminal in the enhanced group call service, but can still not satisfy the time requirement of establishing a call by a called terminal in the normal group call service.

SUMMARY OF THE INVENTION

The present invention is set forth on the basis of the above technical problems, and the object is to provide a method for establishing a call rapidly in a CDMA based cluster communication system to overcome the defects that a long time is required and a response is not timely enough during the establishment of a call by a called terminal in the normal group call service.

According to one aspect of the present invention, a method for establishing a call rapidly by a called terminal in the normal group call service in the CDMA based cluster communication system comprises the following steps:

a dispatching station server transmitting a normal group call request to a base station subsystem after receiving a normal group call request sent by a calling terminal;

the each base station in a dispatching area allocating resource and establishing a forward-backward service channel required by a normal group call service in the base station side after receiving the normal group call request;

each sector of the base station in the dispatching area sending a broadcasting channel assignment message in a form of broadcast message to a terminal in an idle state in the sector in a forward control channel;

the terminal comparing a broadcast address with a group identification stored, if matching, the terminal establishing each service channel in the side of the terminal in the called state according to the broadcast channel assignment message received; if the broadcast address not matching the group identification stored, the terminal discarding the broadcast channel assignment message.

Preferably, the forward-reverse traffic channel in the base station side comprises two forward shared traffic channels, a reverse shared traffic channel and a reverse traffic channel exclusively for a talking terminal.

Preferably, the method takes a group identification uniquely identifying a group in the normal group call service as the broadcast address.

Preferably, the broadcast channel assignment message at least comprises carrier frequency, radio configuration, frame offset and Walsh resource in the forward shared service channel.

Preferably, the group identification is a group ID or a group mobile directory number.

Preferably, the traffic channel in the side of the terminal in the called state comprises two forward shared traffic channels and a reverse shared traffic channel.

In the method of the present invention, the broadcast channel assignment message sent in the forward control channel (paging channel or broadcast channel) indicating each called terminal of the group in the sector to set up a service channel enables the terminal to not need signaling handshaking and service negotiation with the base station, which can efficiently solve the problem that the time of establishing a group call is too long in a normal group call service in a group with a large capacity of users so as to guarantee a quick response and access of each called terminal in a group with a large capacity.

BRIEF DESCRIPTION OF THE DRAWING

FIG. 1 is a flow chart schematically illustrating the method for establishing a call rapidly in a CDMA based cluster communication system according to an embodiment of the present invention.

DESCRIPTION OF THE PREFERRED EMBODIMENTS

Hereafter, the embodiments of the present invention will be described in details with reference to the accompanying drawing so as to represent the above and other objects, features and advantages of the present invention more clearly.

The method of the present invention is set forth in order that the time of establishing a call by a called terminal can satisfy the requirement of a quick response in a cluster in a normal group call service in a CDMA based cluster communication system with respect to the feature that the called terminal shares the forward-reverse traffic channel in the normal group call service. A traffic channel of each called terminal can be set up rapidly and the requirement of a group call with a large capacity in a cluster of a small area in an emergency can be satisfied by using the method.

Hereafter, the technical solution of the present invention will be illustrated in details by taking a CDMA based cluster communication system as an example.

FIG. 1 is a flow illustrating the method for establishing a call rapidly by a called terminal in a normal group call service in a CDMA based cluster communication system according to an embodiment of the present invention. The CDMA based cluster communication system generally comprises a dispatching station server PDS for accomplishing the service processing of a cluster dispatching call, a base station subsystem BSS and terminals for implementing a cluster call, wherein terminals in a same group can be located in a sector of one or plural base stations.

First, in step 101, the dispatching station server PDS begins to set up a normal group call when receiving a normal group call request of a calling terminal in a certain group. In step 102, the dispatching station server PDS sends the normal group call request to the base station subsystem BSS. After receiving the normal group call request, in step 103, each base station in a dispatching area allocates radio resource and sets up a forward-reverse traffic channel required by the normal group call service in the base station side, which comprises two forward shared traffic channels, a reverse shared traffic channel and a reverse traffic channel exclusively for a talking terminal. Then, in step 104, each sector of the base station sends broadcast channel assignment message to a terminal in an idle state in the sector in a forward control channel (e.g. paging channel or broadcast channel), wherein the broadcast channel assignment message is packed in a form of broadcast message and takes a group identification uniquely identifying a group in the normal group call service such as Group ID or Group Mobile Directory Number as a broadcast address. And the broadcast channel assignment message must include carrier frequency, radio configuration, frame offset, Walsh resource in a forward shared traffic channel, and may further include a power control parameter, a backward shared channel signaling sending parameter and a independent switch parameter etc.

Table 1 shows a broadcast channel assignment message adopted in the method of the present invention, wherein the field name, meaning and length of parameters included in the broadcast channel assignment message are shown.

TABLE 1

| FIELD NAME | Length (byte) |
| --- | --- |
| BAND_CLASS | 5 |
| CDMA_FREQ | 11 |
| PILOT_PN | 9 |
| IS_ACTIVE | 1 |
| FOR_RC | 0 or 5 |
| REV_RC | 0 or 5 |
| FRAME_OFFSET | 0 or 4 |
| QOF_MASK_ID_FCH | 0 or 2 |
| CODE_CHAN_FCH | 0 or 8 |
| QOF_MASK_ID_SCH | 0 or 2 |
| CODE_CHAN_SCH | 0 or 8 |
| NORMAL_GROUPCALL_PAPA_INCL | 0 or 1 |
| NORMAL_GROUPCALL_FPC_MODE | 0 or 1 |
| RLGAIN_ADJ | 0 or 4 |
| FCH_CHAN_ADJ_GAIN | 0 or 8 |
| PR_LENGTH | 0 or 2 |
| TR_LENGTH | 0 or 3 |
| MAX_RESEND_NUM | 0 or 4 |
| SIGNALANSWER_TIMER | 0 or 3 |
| SIGNAL_PWRSTEP | 0 or 3 |
| HARDHANDOFF_COMP | 0 or 4 |
| HARDHANDOFF_TIMER | 0 or 4 |

In Table 1, BAND_CLASS represents type of frequency band, CDMA_FREQ represents CDMA frequency point, PILOT_PN represents sequence offset of pilot frequency PN, FOR_RC represents forward radio configuration, REV_RC represents backward radio configuration, FRAME_OFFSET represents frame offset. The meanings of the above field names are identical with those of the same field names in the channel assignment message of the IS 2000 Protocol. IS_ACTIVE represents whether being activated or not and whether channel resource of a normal group call service being established in the field name identified sector. QOF_MASK_ID_FCH represents quasi-orthogonal mask identification of a fundamental channel, CODE_CHAN_FCH represents Walsh code index value of a fundamental channel, QOF_MASK_ID_SCH represents quasi-orthogonal mask identification of a supplementary channel, and CODE_CHAN_SCH represents Walsh code index value of a supplementary channel. The above field names identify Walsh resource allocating information of two forward shared channels in a normal group call service. NORMAL_GROUPCALL_PARA_INCL represents whether system parameter indication of the normal group call service being included or not, which identifies whether system parameters of the normal group call service are included in a broadcast channel assignment message; if the system parameters of the normal group call service are included, the broadcast channel assignment message includes relevant parameters of power control of the normal group call service, which include NORMAL_GROUPCALL_FPC_MODE representing forward power control mode of a normal group call, RLGAIN_ADJ representing power adjusting value of relative access channel of backward service channel and FCH_CHAN_ADJ_GAIN representing gain adjusting value of backward fundamental channel; relevant parameters of signaling sending policy of backward shared channel, which include PR_LENGTH representing signaling prefix length of backward shared channel, TR_LENGTH representing signaling body length of backward shared channel, MAX_RESEND_NUM representing maximum resending times, SIGNALANSWER_TIMER representing acknowledging signaling timer of backward shared channel and SIGNAL_PWRSTEP representing power rising step length of resending signaling; and relevant parameters of independent switch, which include HARDHANDOFF_COMP representing comparing threshold of independent hard switch and HARDHANDOFF_TIMER representing independent hard switch timer. For other parameters required in the process of establishing a service channel by a called terminal but not included in the broadcast channel assignment message, they are configured by adopting default parameters prescribed in the normal group call service by the called terminal.

In step 105, after receiving the broadcast channel assignment message, the terminal in an idle state compares the group identification in the broadcast address such as group number with the group number stored at the terminal. If the same group number exists, then in step 106, the terminal establishes a forward-traffic traffic channel in a called state. In this case, the terminal does not need signaling handshaking and service negotiation with the base station, but directly establishes each traffic channel in a called state according to resource allocating information in the broadcast channel assignment message and then shifts to a service state. The service channel established in a side of a terminal in a called state comprises two forward shared service channels and a backward shared service channel. If the group number in the broadcast address is different from each group number stored at the terminal, then in step 107, the terminal discards the broadcast channel assignment message.

Through the above steps, the called terminal belonging to the same group as the calling terminal establishes a call successfully (step 108). Each called terminal monitors voice or signaling in the forward shared service channel and sends signaling through the backward shared service channel.

INDUSTRIAL APPLICABILITY

The present invention can be applied in the CDMA based cluster communication system.

What is claimed is:

1. A method for establishing a call rapidly in a cluster communication system based on code division multiple access, comprising the following steps:
   a dispatching station server transmitting a normal group call request to a base station subsystem after receiving a normal group call request sent by a calling terminal;
   each of base stations in a dispatching area allocating resource and establishing a forward-reverse traffic channel required by a normal group call service in the base station side after receiving the normal group call request;
   each sector of the base station in the dispatching area sending a broadcast channel assignment message in a form of broadcast message to terminals in an idle state in the sector in a forward control channel; and
   the terminals comparing the broadcast address with a group identification stored, if matching, the terminals establishing each traffic channel in the side of the terminals in the called state according to resource allocating information in the broadcast channel assignment message received; if the broadcast address not matching the group identification stored, the terminals discarding the broadcast channel assignment message.

2. According to the method for establishing a call rapidly in a cluster communication system based on code division multiple access in claim 1, wherein the forward-reverse traffic channel in the base station side comprises two forward shared traffic channels, a reverse shared traffic channel and a reverse traffic channel exclusively for a talking terminal.

3. According to the method for establishing a call rapidly in a cluster communication system based on code division multiple access in claim 1, wherein the method takes a group identification uniquely identifying the group in the normal group call service as the broadcast address.

4. According to the method for establishing a call rapidly in a cluster communication system based on code division multiple access in claim 3, wherein the group identification is group ID or group mobile directory number.

5. According to the method for establishing a call rapidly in a cluster communication system based on code division multiple access in claim 1, wherein the broadcast channel assignment message at least comprises carrier frequency, radio configuration, frame offset and Walsh resource in the forward shared traffic channel.

6. According to the method for establishing a call rapidly in a cluster communication system based on code division multiple access in claim 1, wherein the traffic channels in the side of the terminal in the called state comprise two forward shared traffic channels and a reverse shared traffic channel.

* * * * *